(12) United States Patent
Langford et al.

(10) Patent No.: US 7,788,520 B2
(45) Date of Patent: Aug. 31, 2010

(54) ADMINISTERING A SYSTEM DUMP ON A REDUNDANT NODE CONTROLLER IN A COMPUTER SYSTEM

(75) Inventors: John S. Langford, Austin, TX (US); Atit D. Patel, Austin, TX (US); Joshua N. Poimboeuf, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 11/855,355

(22) Filed: Sep. 14, 2007

(65) Prior Publication Data

US 2009/0077412 A1     Mar. 19, 2009

(51) Int. Cl.
    *G06F 11/00*  (2006.01)
(52) U.S. Cl. ............... 714/3; 714/4; 714/11; 714/15; 714/25; 714/37; 714/43; 370/225
(58) Field of Classification Search ............... 714/3, 714/4, 11, 15, 25, 37, 43; 370/225
See application file for complete search history.

(56) References Cited

U.S. PATENT DOCUMENTS 5,712,972 A     1/1998  Kakkar
6,119,246 A     9/2000  McLaughlin et al.
7,149,917 B2   12/2006  Huang et al.
7,188,346 B2    3/2007  Martin et al.
2006/0156077 A1 7/2006  Altaf et al.
2006/0230309 A1 10/2006 Kromer et al.
2007/0168705 A1* 7/2007 Dohi ........................... 714/6
2009/0070639 A1* 3/2009 Langford et al. .............. 714/57

\* cited by examiner

*Primary Examiner*—Robert Beausoliel
*Assistant Examiner*—Charles Ehne
(74) *Attorney, Agent, or Firm*—Brandon C. Kennedy; Libby Toub; Biggers & Ohanian LLP

(57) ABSTRACT

Administering a system dump on a redundant node controller including detecting a communications failure between a system controller and the redundant node controller; generating a unique identifier for the communications failure; instructing a primary node controller to provoke a system dump on the redundant node controller; provoking the system dump on the redundant node controller including suspending a processor of the redundant node controller and storing during the suspension of the processor the unique identifier for the communications failure and an instruction to execute the system dump on the redundant node controller; releasing the processor of the redundant node controller from suspension; in response to releasing the processor from suspension, identifying the unique identifier for the communications failure and the instruction to execute the system dump; and executing the system dump including associating the system dump with the unique identifier.

18 Claims, 4 Drawing Sheets

ADMINISTERING A SYSTEM DUMP ON A REDUNDANT NODE CONTROLLER IN A COMPUTER SYSTEM

BACKGROUND OF THE INVENTION

1. Field of the Invention

The field of the invention is data processing, or, more specifically, methods, apparatus, and products for administering a system dump on a redundant node controller in a computer system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

The combination of hardware and software components in computer systems today has progressed to the point that computer systems can be highly reliable. Reliability in computer systems may be provided by using redundant components in the computer system. In some computer systems, for example, components such as node controllers that manage hardware error requests in nodes of the computer system are provided in redundant pairs—one primary node controller, one redundant node controller. When such a primary node controller fails, the redundant node controller takes over the primary node controller's operations.

From time to time a redundant node controller loses communication with other components in the computer system. A redundant node controller, after losing communication, typically generates a system dump and reboots. The devices with which the redundant node controller loses communication, generate an error log. System administrators attempt to correlate the system dump from the redundant controller and the error logs from the other devices to identify and debug the underlying error that caused the loss of communication. Typically, however, many error logs and system dumps are created in a computer system during a period of time and it is often difficult to correlate a system dump with the correct corresponding error logs. Moreover, in situations where an application running on a redundant node controller is unaware of the communication loss, the redundant node controller is typically incapable of creating a system dump before being forced to reboot. Readers of skill in the art will recognize therefore that there exists room for improvement in administering a system dump on a redundant node controller in a computer system.

SUMMARY OF THE INVENTION

Methods, apparatus, and products for administering a system dump on a redundant node controller in a computer system are disclosed that include detecting by a system controller a communications failure between the system controller and the redundant node controller; generating by the system controller a unique identifier for the communications failure; instructing, by the system controller, a primary node controller to provoke a system dump on the redundant node controller including providing to the primary node controller the unique identifier for the communications failure; provoking, by the primary node controller, the system dump on the redundant node controller including suspending a processor of the redundant node controller and storing during the suspension of the processor the unique identifier for the communications failure and an instruction to execute the system dump on the redundant node controller; releasing, by the primary node controller, the processor of the redundant node controller from suspension; in response to releasing the processor from suspension, identifying, by the redundant node controller, the unique identifier for the communications failure and the instruction to execute the system dump; and executing the system dump including associating the system dump with the unique identifier.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
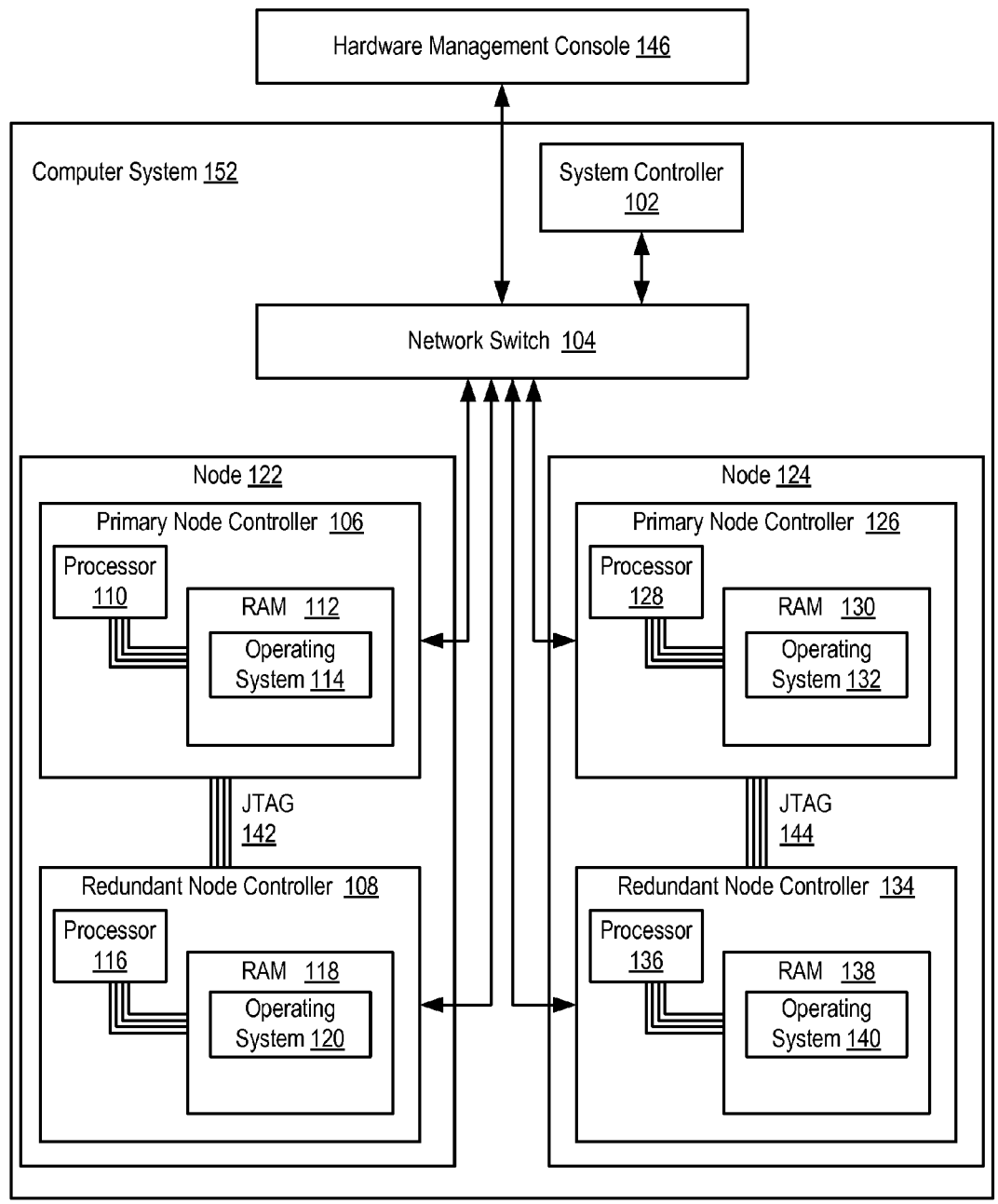
FIG. 1 sets forth a block diagram of automated computing machinery comprising an exemplary computer system useful in administering a system dump on a redundant node controller according to embodiments of the present invention.

Exemplary methods, apparatus, and products for administering a system dump on a redundant node controller in a computer system in accordance with the present invention are described with reference to the accompanying drawings, beginning with FIG. 1. FIG. 1 sets forth a block diagram of automated computing machinery comprising an exemplary computer system (152) useful in administering a system dump on a redundant node controller according to embodiments of the present invention. The computer system of FIG. 1 is an example of a 'distributed' computer system (152). The term 'distributed' as used in this specification describes a computer system that includes multiple, physically distinct devices that operate together as a single computer system. The computer system (152) of FIG. 1, for example, includes several physically discrete devices such as a system controller, a network switch, and two nodes (122,124).

A node is a processing device contained in computer system that executes user applications. A node may be a web server, a database, or any other computing device. Although not shown here, nodes may include any number of devices such as computer processors, computer memory, disk drive adapters, disk drives, communication adapters, bus adapters, and so on as will occur to those of skill in the art. The computer system (152) of FIG. 1 is configured with only two nodes (122,124), but readers of skill in the art will immediately recognize that computer systems useful in administering a system dump on a redundant node controller of a computer according to embodiments of the present invention may include any number of nodes. In typical embodiments of the present invention, for example, a computer system may include from one to eight nodes.

Each node (122,124) in the system of FIG. 1 includes two node controllers configured as a set of buddies. A node controller is a device contained in a node that attends to any hardware error requests of the node that occur during operation of the computer system. In the exemplary computer system (152) of FIG. 1 each node controller (106,108,126, 134) contains a computer processor (110,116,128,136) operatively coupled to computer memory, RAM (112,118, 130,138). Store in RAM in each of the node controllers is an operating system (114,120,132,140). Operating systems useful in node controllers according to embodiments of the present invention include UNIX™, Linux™, Microsoft XP™, Microsoft Vista™, AIX™, IBM's i5/OS™, and others as will occur to those of skill in the art.

As mentioned above the two node controllers contained in each node are configured as a set of buddies. A set of buddies is a group of node controllers that provides, as a group, reliable node controller operations due to redundancy—when one node controller fails another redundant node controller takes over node controller operations for the node of the computer system. In the exemplary computer (152) of FIG. 1, primary node controller's (106) buddy is the redundant node controller (108) and vice versa. Also in the exemplary computer (152) of FIG. 1, primary node controller's (126) buddy is redundant node controller (134) and vice versa.

Only one node controller in a set of buddies is configured as a primary node controller at one time. The primary node controller is the node controller in which all node controller operations are carried out for a node of the computer system. A redundant node controller, in contrast, carries out no node controller operations for the node of the computer system until the primary node controller fails. Communication between node controllers in a node occurs through two different communications channels. Primary, in-band, data communications between the node controllers in a node occurs through the network switch. Such data communications may be carried out using any network protocol such as for example, Stream Control Transport Protocol ('SCTP'), TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Data communications other than primary data communications, called out-of-band data communications, is carried out through an out-of-band data communications link.

In the system of FIG. 1 the out-of-band data communication link for each set of node controllers are implemented as Joint Test Action Group ('JTAG') data communications links (142,144). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. Although the out-of-band data communication links in the exemplary system of FIG. 1 are implemented as a JTAG communications link one of skill in the art will recognize that the out-of-band data communication link may be implemented as any data communications link capable of enabling out-of-band communication between node controllers in a node including, for example, such data communications links as:

- I²C bus, a serial computer bus invented by Philips that is used to for low-speed communications with peripheral components of a system. The name stands for Inter-Integrated Circuit and is pronounced I-squared-C or sometimes as I-two-C.
- 1-Wire bus, a device communications bus system designed by Dallas Semiconductor that provides low-speed data, signaling and power over a single wire, in addition to a ground wire. 1-Wire is similar in concept to I²C, but with lower data rates and a much lower cost. It is typically used to communicate with small inexpensive devices.
- System Management Bus ('SMBus'), a two-wire bus used for communication with low-bandwidth devices on a motherboard, especially power related chips. Other devices might include temperature sensors and lid switches. A device can provide manufacturer information, indicate its model/part number, save its state for a suspend event, report errors, accept control parameters, and return status using SMB.
- Serial Peripheral Interface ('SPI'), a synchronous serial data link standard named by Motorola that operates in full duplex mode. Devices communicate in master/slave mode where the master device initiates the data frame. Multiple slave devices are enabled using separate select lines.
- Intelligent platform management bus ('IPMB'), an enhanced implementation of I²C, the IPMB connects a baseboard management controller to other controllers for communication via the intelligent platform management interface ('IPMI') specification. The IPMI specification defines a set of common interfaces to computer hardware and firmware which system administrators can use to monitor system health and manage the system.
- Others as will occur to those of skill in the art.

A system controller (102) is a controller that manages nodes in a computer system. System controllers may collect error and operational status information from nodes during the operation of the computer system as well as direct operations of the nodes. Although only one system controller is shown in FIG. 1 for clarity in some embodiments of the present invention the computer system (152) also includes a redundant system controller to provide reliability. A system controller is connected for data communications to the nodes (122,124) through a network switch (104).

System administrators may use the system controller (102), through a hardware management console (146), to administer hardware contained within the computer system (152). A hardware management console is automated computing machinery and computer program instructions operating on the automated computing machinery that provide a standard interface to users for configuring and operating the computer system. Such a hardware management console is typically connected for data communications to the nodes of the computer system through the network switch (104) or other network device, such as a router.

A network switch is a computer networking device that connects network segments. Devices connected to the network switch may communicate with one other another according to any data communications protocol as will occur to those of skill in the art, including for example, TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. A network switch is typically capable of inspecting data packets from a networked entity as the data packets are received, determining the source and destination device of each packet, and forwarding each data packet to the appropriate destination device. Some network switches are configured for additional operations. The network switch of FIG. 1, for example, is capable of answering queries of the system controller concerning network connectivity. From time to time a system controller may query the network switch to determine if a particular node, or node controller within a particular node, is physically connected to the network.

As mentioned above, the computer system (152) of FIG. 1 operates generally for administering a system dump on a redundant node controller. Administering a system dump on a redundant node controller includes detecting by a system controller (102) a communications failure between the system controller (102) and the redundant node controller (108), generating by the system controller (102) a unique identifier for the communications failure, and instructing, by the system controller (102), a primary node controller (106) to provoke a system dump on the redundant node controller (108) including providing to the primary node controller (106) the unique identifier for the communications failure.

The system of FIG. 1 also administers a system dump on a redundant node controller by provoking, by the primary node controller (106), the system dump on the redundant node controller including suspending a processor (110) of the redundant node controller (108) and storing during the suspension of the processor (110) the unique identifier for the communications failure and an instruction to execute the system dump on the redundant node controller (108). The system of FIG. 1 also administers a system dump on a redundant node controller (108) by releasing, by the primary node controller (106), the processor (110) of the redundant node controller (108) from suspension, and, in response to releasing the processor (110) from suspension, identifying, by the redundant node controller (108), the unique identifier for the communications failure and the instruction to execute the system dump. The system of FIG. 1 also administering a system dump on a redundant node controller (108) by executing the system dump including associating the system dump with the unique identifier.

When a communications failure occurs the system controller not only generates a unique identifier, but the system controller also creates an error log. This error log may include all types of information useful for identifying and debugging errors in a computer system. The error log also includes the unique identifier. The system dump created by the redundant node controller and the error log created by the system controller may be passed on to the Hardware Management Controller ('HMC') where the system dump and error log can be used by a user, such as a system administrator, to identify and debug the error causing the communication failure in the computer system. Having the unique identifier in both the error log and the system dump enables the system administrator to quickly determine that the two correspond to the same communications failure.

A system dump is the recorded state of the working memory of a redundant node controller at a specific time, typically when a program running on the redundant node controller has determines a loss of communications with the system controller. In some situations, however, an application running is unaware of a loss of communications with the system controller and is incapable of creating a system dump. System dumps are often used to diagnose or debug errors in computer systems. In addition to the recorded state of the working memory of the redundant node controller (108), a dump may also contain other key pieces of information including, for example, information for the applications running on the redundant node controller (108) maintained in volatile memory, application state variables for the applications running on the redundant node, data contained in application registers for the applications running on the redundant node, and other information stored in non-volatile memory of the redundant node controller (108).

In the system of FIG. 1, detecting by a system controller a communications failure between the system controller and the redundant node controller (108) may be carried out by identifying by the system controller a failure by the redundant node controller (108) to respond to a ping of a heartbeat for a predetermined period of time. The term 'heartbeat' as used in this specification is any signal shared between two devices, the existence of which represents an active communication channel between the devices. The loss of a heartbeat represents a failure of the communication channel between the devices. In the system of FIG. 1, for example, the heartbeat between the system controller (102) and redundant node controller (108) may consist of a ping from the system controller, through the network switch (104) to the redundant node controller (108), followed by a response from the redundant node controller. A ping is a computer network tool used to test whether a particular device is reachable across a network. A ping may be carried out in several ways including, for example, by sending Internet Control Message Protocol ('ICMP') echo request packets to the device through the network and listening for an ICMP echo response, by transmitting between the devices custom ping-pong messages according to the Stream Control Transport Protocol ('SCTP'), or in other ways as will occur to those of skill in the art.

Consider for further explanation that the predefined period of time is one hour and that the system controller (102) of FIG. 1 is configured to ping the redundant node controller (108) every 15 seconds. If the system controller pings the redundant node controller every 15 seconds for one hour, but does not receive a response from the redundant node controller during the one hour, the system controller determines the loss of the heartbeat.

In the system of FIG. 1, generating by the system controller (102) a unique identifier for the communications failure may be carried out in various ways. The system controller may be configured, for example, to increase a count for each communications failure between the system controller and any redundant node controller in the computer system. The system controller may then use the count as the unique identifier for the communication failure.

In the system of FIG. 1, instructing, by the system controller, a primary node controller (106) to provoke a system dump on the redundant node controller (108) including providing to the primary node controller (106) the unique identifier for the communications failure is carried out through in-band data communications through the network switch (104). Such data communications may be carried out according to any protocol as will occur to those of skill in the art including, for example, TCP (Transmission Control Protocol), IP (Internet Protocol), HTTP (HyperText Transfer Protocol), WAP (Wireless Access Protocol), HDTP (Handheld Device Transport Protocol), and others.

In the system of FIG. 1 provoking, by the primary node controller (106), the system dump on the redundant node controller (108) is carried out by suspending a processor (110) of the redundant node controller (108) and storing during the suspension of the processor (110) the unique identifier for the communications failure and an instruction to execute the system dump on the redundant node controller (108). The primary node controller (106) suspends a processor (110) of the redundant node controller (108) by stopping a clock of the redundant node controller (108) through an out-of-band communications link. In the system FIG. 1 the primary node controller (106) stops the clock of the redundant node controller (108) through the JTAG communications link. Storing during the suspension of the processor (110) the unique identifier for the communications failure is carried out by using the out-of-band communications link, the JTAG communications link, to store the unique identifier in memory of the redundant node controller (108). Storing an instruction to execute the system dump on the redundant node controller (108) is carried out by using the out-of-band communications link to set a bit in the interrupt register of the redundant node controller (108), the bit representing an instruction execute a system dump and reset.

In the system of FIG. 1, releasing, by the primary node controller (106), the processor (110) of the redundant node controller (108) from suspension is carried out by restarting, through the out-of-band communications link, the redundant node's clock. Restarting the redundant node controller's clock enables operations of the redundant node controller.

In the system of FIG. 1, identifying, by the redundant node controller (108), the unique identifier for the communications failure and the instruction to execute the system dump is carried out by, identifying the bit set in the interrupt register of the redundant node controller (108) and in response to identifying the bit set in the interrupt register, executing computer program instructions to reset that include checking a memory location for an instruction to execute the system dump.

In the system of FIG. 1 executing the system dump including associating the system dump with the unique identifier is carried out by storing information for applications running on the redundant node controller maintained in volatile memory, storing application state variables for the applications running on the redundant node, and storing data contained in application registers for the applications running on the redundant node. Although only three types of exemplary information are described here as being part of a system dump of a redundant node controller, persons of skill in the art will immediately recognize that redundant node controllers may be configured to include in a system dump any information useful for identifying and debugging errors in a computer system.

The arrangement of nodes, node controllers, switch, and system controller making up the exemplary system illustrated in FIG. 1 are for explanation, not for limitation. Computer systems useful according to various embodiments of the present invention may include additional nodes, servers, routers, other devices, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
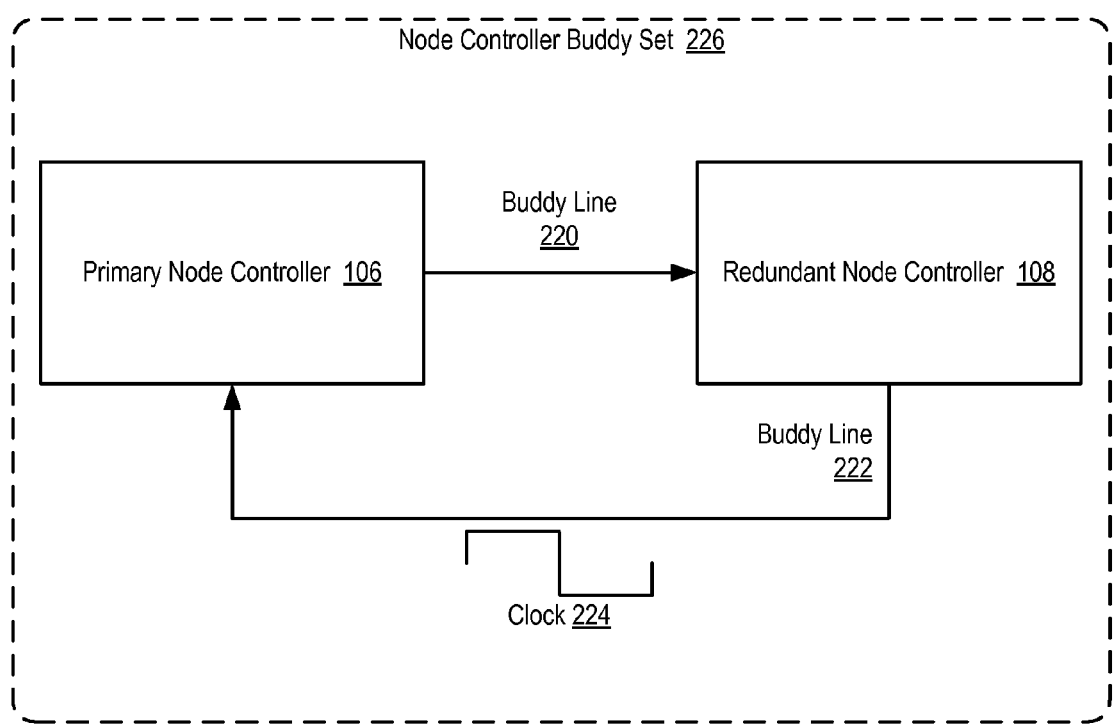
FIG. 2 sets forth a block diagram of a node controller buddy set useful in administering a system dump on a redundant node controller in a computer system according to embodiments of the present invention.

For further explanation FIG. 2 sets forth a block diagram of a node controller buddy set (226) useful in administering a system dump on a redundant node controller in a computer system according to embodiments of the present invention. The node controller buddy set (226) of FIG. 2 includes a primary node controller (106) and a redundant node controller (108). The primary and redundant node controllers are connected by two buddy lines (220,222).

Buddies in a set (226) may be configured to share one or more buddy lines. Buddy lines (220,222) provide a channel for either buddy in the set to monitor and control operating parameters of the other buddy in the set. One buddy may monitor or control its buddy's clock for example. The buddy lines may be implemented as any out-of-band communication link including a JTAG communications link, $I^2C$ bus, 1-Wire bus, SMBus, SPI, IPMB, and others as will occur to those of skill in the art.

Administering a system dump on a redundant node controller in a computer system according to embodiments of the present invention includes suspending, by the primary node controller, a processor of the redundant node controller (108). Suspending the processor of the redundant node controller is carried out by stopping a clock (224) of the redundant node controller (108). In the system of FIG. 2, the primary node controller (106) may stop the clock (224) of the redundant node controller through the buddy lines (224, 220) of FIG. 2.

Administering a system dump on a redundant node controller in a computer system according to embodiments of the present invention also includes releasing, by the primary node controller, the processor of the redundant node controller (108) from suspension. Releasing the processor of the redundant node controller from suspension is carried out by restarting the clock (224) of the redundant node controller (108). In the system of FIG. 2, the primary node controller (106) may restart the clock (224) of the redundant node controller through the buddy lines (224, 220) of FIG. 2.

Figure 3:
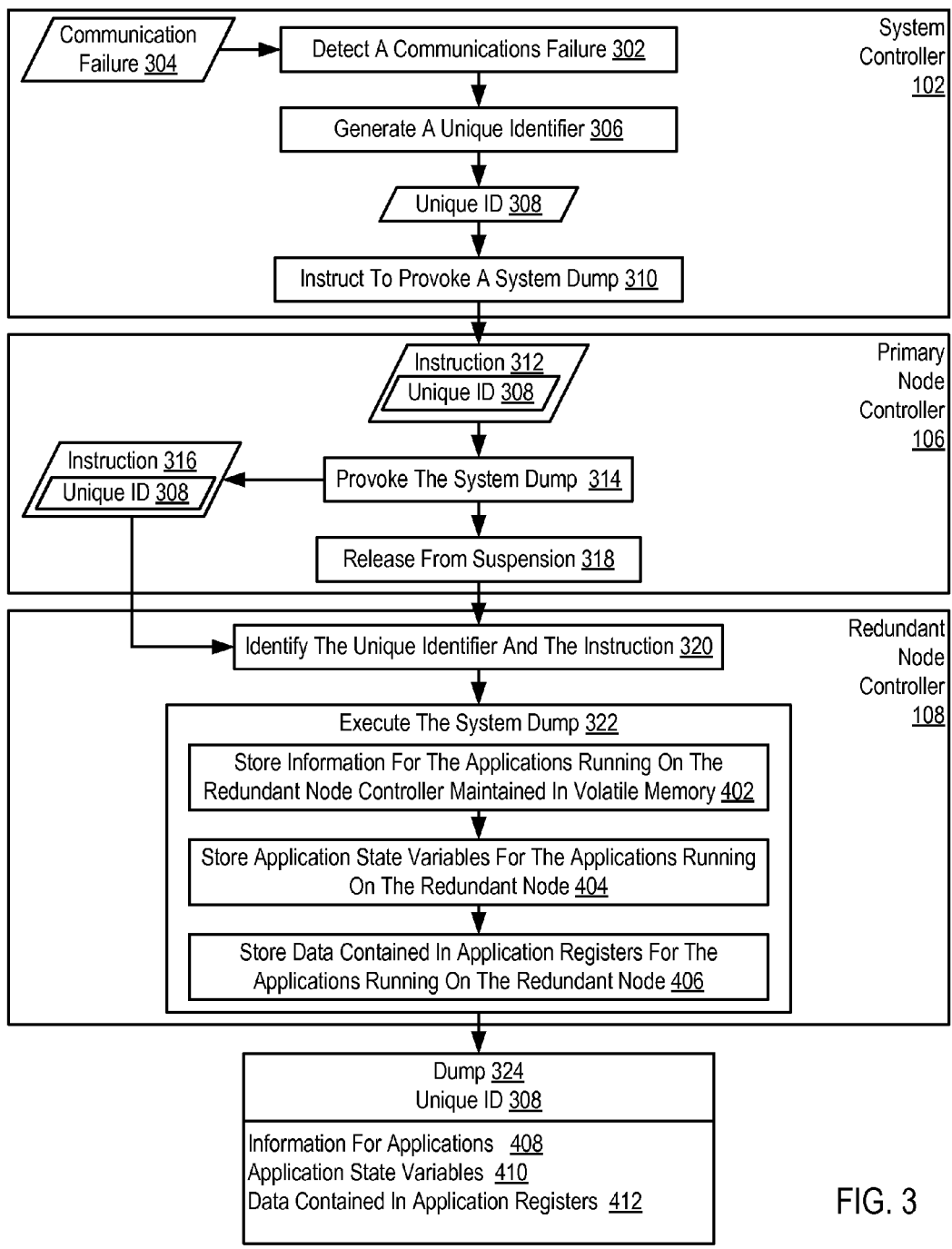
FIG. 3 sets forth a flow chart illustrating an exemplary method for administering a system dump on a redundant node controller in a computer system according to embodiments of the present invention.

For further explanation, FIG. 3 sets forth a flow chart illustrating an exemplary method for administering a system dump on a redundant node controller in a computer system according to embodiments of the present invention. The method of FIG. 3 includes detecting (302) by a system controller (102) a communications failure (304) between the system controller (102) and the redundant node controller (108). Detecting (302) a communications failure between the system controller and the redundant node controller may be carried out by identifying by the system controller a failure by the redundant node controller (108) to respond to a ping of a heartbeat for a predetermined period of time.

The method of FIG. 3 also includes generating (306) by the system controller (102) a unique identifier (308) for the communications failure (304). Generating a unique identifier for the communications failure may be carried out in various ways. One such way of generating a unique identifier (308) for the communications failure, for example, includes increasing by the system controller a count for each communication failure between the system controller (102) and any redundant node in the computer system and using the count as the unique identifier (308) for the current communication failure (304).

The method of FIG. 3 also includes instructing (310), by the system controller (102), a primary node controller (106) to provoke a system dump (324) on the redundant node controller (108) including providing to the primary node controller the unique identifier (308) for the communications failure. The system controller (102) sends the instruction (312) to provoke a system dump (324) on the redundant node controller (108) to the primary node controller (106) through in-band data communications in the computer system. Such data communications may be carried out according to any protocol as will occur to those of skill in the art including, for example, TCP (Transmission Control Protocol), IP (Internet Protocol), HTTP (HyperText Transfer Protocol), WAP (Wireless Access Protocol), HDTP (Handheld Device Transport Protocol), and others.

The method of FIG. 3 also includes provoking (314), by the primary node controller (106), the system dump (324) on the redundant node controller (108). Provoking (314) the system dump (324) on the redundant node controller (108) is carried out by suspending a processor of the redundant node controller (108) and storing during the suspension of the processor the unique identifier (308) for the communications failure and an instruction (316) to execute the system dump on the redundant node controller.

The primary node controller (106) suspends a processor of the redundant node controller (108) by stopping a clock of the redundant node controller (108) through an out-of-band communications link, such as a JTAG communication link. The primary node controller stores during the suspension of the processor the unique identifier (308) for the communications failure by using the out-of-band communication link, the JTAG communication link, to store the unique identifier (308) in memory of the redundant node controller (108). Storing an instruction to execute the system dump on the redundant node controller (108) is carried out by using the out-of-band communications link to set a bit in the interrupt register of the redundant node controller (108), the bit representing an instruction to reset, and execute the system dump.

The method of FIG. 3 also includes releasing (318), by the primary node controller (106), the processor of the redundant node controller (106) from suspension. Releasing the processor of the redundant node controller (106) from suspension is carried out be restarting the clock of the redundant node controller (106).

In response to releasing the processor from suspension, the method of FIG. 3 continues by identifying (320), by the redundant node controller (108), the unique identifier (308) for the communications failure (304) and the instruction (316) to execute the system dump (324). Identifying (320), by the redundant node controller (108), the unique identifier (308) for the communications failure (304) and the instruction (316) to execute the system dump (324) is carried out by identifying the bit set in the interrupt register of the redundant node controller (108), executing computer program instructions to reset that include checking a memory location for an instruction to execute the system dump (324).

The method of FIG. 3 also includes executing (322) the system dump (324) including associating the system dump with the unique identifier (308). Executing (322) the system dump (324) including associating the system dump (324) with the unique identifier (308) is carried out by storing (402) information (408) for applications running on the redundant node controller maintained in volatile memory; storing (404) application state variables (410) for the applications running on the redundant node; and storing (406) data (412) contained in application registers for the applications running on the redundant node. Although only three types of exemplary information are described here as being part of the system dump (324) of a redundant node controller (108), persons of skill in the art will immediately recognize that redundant node controllers according to embodiments of the present invention may be configured to include in the system dump any information useful for identifying and debugging errors in a computer system.

Figure 4:
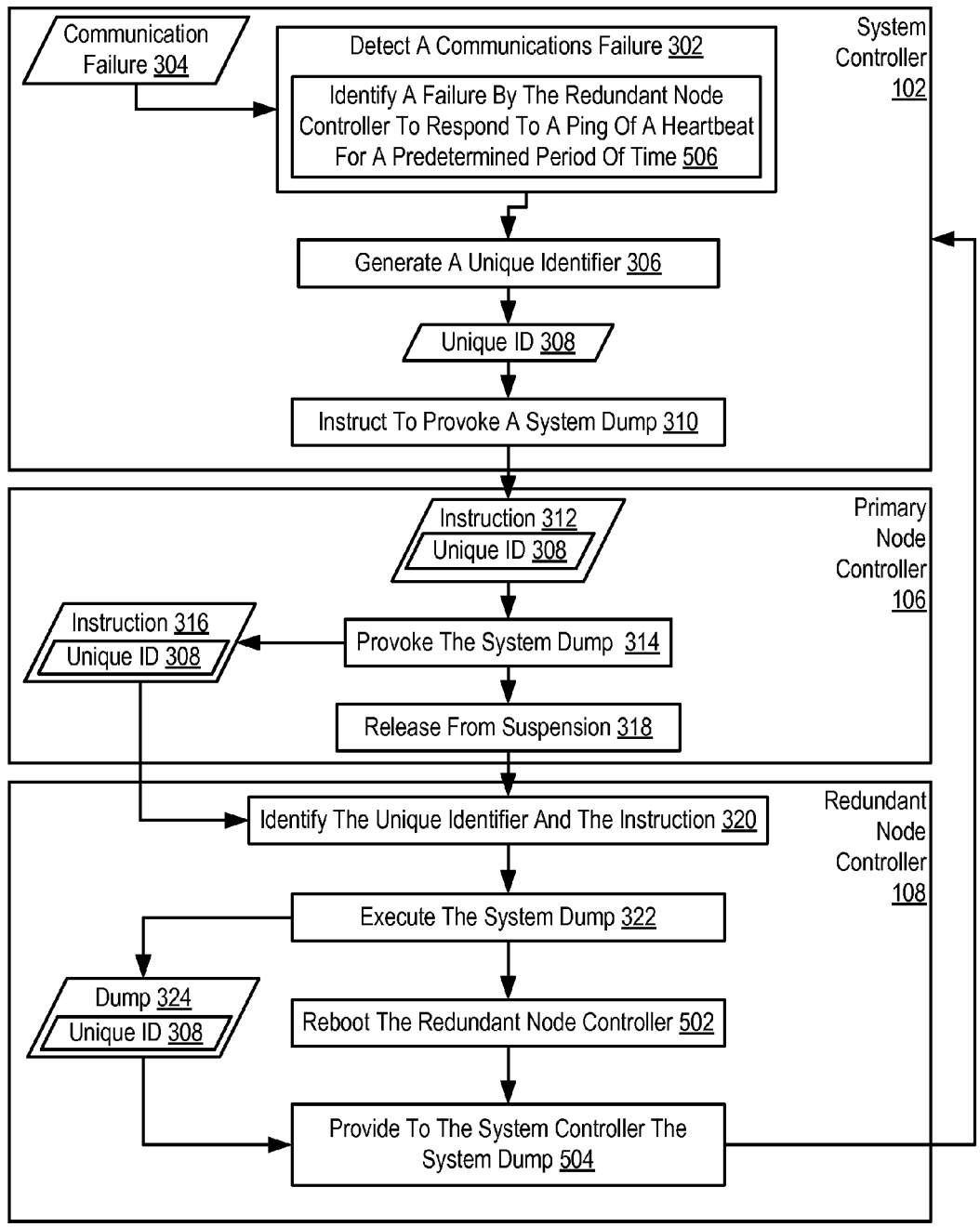
FIG. 4 sets forth a flow chart illustrating a further exemplary method for administering a system dump on a redundant node controller in a computer system according to embodiments of the present invention.

For further explanation, FIG. 4 sets forth a flow chart illustrating a further exemplary method for administering a system dump on a redundant node controller in a computer system according to embodiments of the present invention.

The method of FIG. 4 is similar to the method of FIG. 3 in that the method of FIG. 4 also includes detecting (302) a communications failure (304); generating (306) a unique identifier (308); instructing (310) a primary node controller (106) to provoke a system dump (324) on the redundant node controller (108); provoking (314) the system dump (324) including suspending a processor of the redundant node controller and storing during the suspension of the processor the unique identifier for the communications failure and an instruction to execute the system dump on the redundant node controller; releasing (318) the processor of the redundant node controller (108) from suspension; in response to releasing the processor from suspension, identifying (320) the unique identifier and the instruction to execute the system dump; and executing (322) the system dump (324).

The method of FIG. 4 differs from the method of FIG. 3, however, in that, in the method of FIG. 4 detecting (302) by a system controller (102) a communications failure (304) between the system controller (102) and the redundant node controller (108) is carried out by identifying (506) by the system controller (102) a failure by the redundant node controller (108) to respond to a ping of a heartbeat for a predetermined period of time.

As mentioned above, the term 'heartbeat' as used in this specification is any signal shared between two devices, the existence of which represents an active communication channel between the devices. The loss of a heartbeat represents a failure of the communication channel between the devices. The heartbeat between the system controller (102) and redundant node controller (108) may consist of a ping from the system controller, through the network switch (104) to the redundant node controller (108), followed by a response from the redundant node controller. A ping is a computer network tool used to test whether a particular device is reachable across a network. A ping may be carried out in several ways including, for example, by sending Internet Control Message Protocol ('ICMP') echo request packets to the device through the network and listening for an ICMP echo response, by transmitting between the devices custom ping-pong messages according to the Stream Control Transport Protocol ('SCTP'), or in other ways as will occur to those of skill in the art.

Consider for further explanation that the predefined period of time is one hour and that the system controller (102) of FIG. 3 is configured to ping the redundant node controller (108) every 15 seconds. If the system controller pings the redundant node controller every 15 seconds for one hour, but does not receive a response from the redundant node controller during the one hour, the system controller determines the loss of the heartbeat.

The method of FIG. 4 also differs from the method of FIG. 3 in that the method FIG. 4 also includes rebooting (502) the redundant node controller (108) and, upon restoring communications, providing (504), by the redundant node controller (108) to the system controller (504), the system dump (324). When a communications failure occurs the system controller not only generates a unique identifier, but the system controller also creates an error log. This error log may include all types of information useful for identifying and debugging errors in a computer system. The error log also includes the unique identifier. The system dump (324) created by the redundant node controller and the error log created by the system controller may be passed on to the Hardware Management Controller ('HMC') where the system dump and error log can be used by a user, such as a system administrator, to identify and debug the error causing the communication failure in the computer system.

In view of the explanations set forth above, readers will recognize that the benefits of administering a system dump on a redundant node controller in a computer system according to embodiments of the present invention include:

Enabling a system administrator to efficiently identify error logs and system dumps that correspond to the same underlying communication failure.

Provoking a system dump on a redundant node controller that under typical situations may not create a system dump.

Exemplary embodiments of the present invention are described largely in the context of a fully functional computer system for administering a system dump on a redundant node controller in a computer system. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for administering a system dump on a redundant node controller in a computer system, the method comprising:

detecting by a system controller a communications failure between the system controller and the redundant node controller;

generating by the system controller a unique identifier for the communications failure;

instructing, by the system controller, a primary node controller to provoke a system dump on the redundant node controller including providing to the primary node controller the unique identifier for the communications failure;

provoking, by the primary node controller, the system dump on the redundant node controller including suspending a processor of the redundant node controller and storing during the suspension of the processor the unique identifier for the communications failure and an instruction to execute the system dump on the redundant node controller;

releasing, by the primary node controller, the processor of the redundant node controller from suspension;

in response to releasing the processor from suspension, identifying, by the redundant node controller, the unique identifier for the communications failure and the instruction to execute the system dump; and executing the system dump including associating the system dump with the unique identifier.

2. The method of claim 1 wherein executing the system dump further comprises:

storing information for applications running on the redundant node controller maintained in volatile memory;

storing application state variables for the applications running on the redundant node; and storing data contained in application registers for the applications running on the redundant node.

3. The method of claim 1 further comprising rebooting the redundant node controller and, upon restoring communications, providing, by the redundant node controller to the system controller, the system dump.

4. The method of claim 1 wherein detecting by a system controller a communications failure between the system controller and a redundant node controller further comprises identifying by the system controller a failure by the redundant node controller to respond to a ping of a heartbeat for a predetermined period of time.

5. The method of claim 1 wherein suspending a processor of the redundant node controller further comprises stopping a clock of the redundant node controller.

6. The method of claim 1 wherein provoking, by the primary node controller, a system dump on the redundant node controller is carried out through an out-of-band communications link.

7. An apparatus for administering a system dump on a redundant node controller in a computer system, the apparatus comprising a computer processor, a computer memory operatively coupled to the computer processor, the computer memory having disposed within it computer program instructions capable of:

detecting by a system controller a communications failure between the system controller and the redundant node controller;

generating by the system controller a unique identifier for the communications failure;

instructing, by the system controller, a primary node controller to provoke a system dump on the redundant node controller including providing to the primary node controller the unique identifier for the communications failure;

provoking, by the primary node controller, the system dump on the redundant node controller including suspending a processor of the redundant node controller and storing during the suspension of the processor the unique identifier for the communications failure and an instruction to execute the system dump on the redundant node controller;

releasing, by the primary node controller, the processor of the redundant node controller from suspension;

in response to releasing the processor from suspension, identifying, by the redundant node controller, the unique identifier for the communications failure and the instruction to execute the system dump; and executing the system dump including associating the system dump with the unique identifier.

8. The apparatus of claim 7 wherein executing the system dump further comprises:

storing information for applications running on the redundant node controller maintained in volatile memory;

storing application state variables for the applications running on the redundant node; and storing data contained in application registers for the applications running on the redundant node.

9. The apparatus of claim 7 further comprising computer program instructions capable of rebooting the redundant node controller and, upon restoring communications, providing, by the redundant node controller to the system controller, the system dump.

10. The apparatus of claim 7 wherein detecting by a system controller a communications failure between the system controller and a redundant node controller further comprises identifying by the system controller a failure by the redundant node controller to respond to a ping of a heartbeat for a predetermined period of time.

11. The apparatus of claim 7 wherein suspending a processor of the redundant node controller further comprises stopping a clock of the redundant node controller.

12. The apparatus of claim 7 wherein provoking, by the primary node controller, a system dump on the redundant node controller is carried out through an out-of-band communications link.

13. A computer program product for administering a system dump on a redundant node controller in a computer system, the computer program product disposed in a computer readable, recordable medium, the computer program product comprising computer program instructions capable of:

generating by the system controller a unique identifier for the communications failure;

instructing, by the system controller, a primary node controller to provoke a system dump on the redundant node controller including providing to the primary node controller the unique identifier for the communications failure;

provoking, by the primary node controller, the system dump on the redundant node controller including suspending a processor of the redundant node controller and storing during the suspension of the processor the unique identifier for the communications failure and an instruction to execute the system dump on the redundant node controller;

releasing, by the primary node controller, the processor of the redundant node controller from suspension;

in response to releasing the processor from suspension, identifying, by the redundant node controller, the unique identifier for the communications failure and the instruction to execute the system dump; and executing the system dump including associating the system dump with the unique identifier.

14. The computer program product of claim 13 wherein executing the system dump further comprises:

storing information for applications running on the redundant node controller maintained in volatile memory;

storing application state variables for the applications running on the redundant node; and storing data contained in application registers for the applications running on the redundant node.

15. The computer program product of claim 13 further comprising computer program instructions capable of rebooting the redundant node controller and, upon restoring communications, providing, by the redundant node controller to the system controller, the system dump.

16. The computer program product of claim 13 wherein detecting by a system controller a communications failure between the system controller and a redundant node controller further comprises identifying by the system controller a failure by the redundant node controller to respond to a ping of a heartbeat for a predetermined period of time.

17. The computer program product of claim 13 wherein suspending a processor of the redundant node controller further comprises stopping a clock of the redundant node controller.

18. The computer program product of claim 13 wherein provoking, by the primary node controller, a system dump on the redundant node controller is carried out through an out-of-band communications link.

* * * * *